US008091673B2

(12) United States Patent
Shinsho

(10) Patent No.: US 8,091,673 B2
(45) Date of Patent: Jan. 10, 2012

(54) STRADDLE TYPE VEHICLE

(75) Inventor: Masami Shinsho, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1304 days.

(21) Appl. No.: 11/432,767

(22) Filed: May 11, 2006

(65) Prior Publication Data

US 2006/0273608 A1    Dec. 7, 2006

(30) Foreign Application Priority Data

May 11, 2005    (JP) .................................. 2005-139004

(51) Int. Cl.
*B62K 11/02* (2006.01)
(52) U.S. Cl. ...................................... 180/219; 296/37.1
(58) Field of Classification Search .................. 180/219; 296/37.1; 396/37.1
See application file for complete search history.

(56) References Cited

U.S. PATENT DOCUMENTS

| 1,854,401 | A | * | 4/1932 | Fitzsimmons | .................. | 336/90 |
| 2,071,761 | A | * | 2/1937 | Nicholson | ..................... | 180/226 |
| 3,937,484 | A | * | 2/1976 | Morioka et al. | .............. | 180/219 |
| 3,944,009 | A | * | 3/1976 | Katagiri | ........................ | 180/219 |
| 4,011,921 | A | * | 3/1977 | Sakamoto et al. | ............ | 180/229 |
| 4,137,883 | A | * | 2/1979 | Yoshida et al. | ................ | 123/633 |
| 4,260,170 | A | * | 4/1981 | Terai et al. | ..................... | 280/276 |
| 4,364,340 | A | * | 12/1982 | Kimura | ..................... | 123/184.34 |
| 4,438,828 | A | * | 3/1984 | Nakagawa | ..................... | 180/219 |
| 4,492,284 | A | * | 1/1985 | Hayashi | ......................... | 180/219 |
| 4,830,134 | A | * | 5/1989 | Hashimoto | .................... | 180/219 |
| 5,303,795 | A | * | 4/1994 | Buell | .............................. | 180/219 |
| 5,323,869 | A | * | 6/1994 | Kurayoshi et al. | ............. | 180/219 |
| 5,388,660 | A | * | 2/1995 | Shirasagi et al. | ............. | 180/219 |
| 6,131,682 | A | * | 10/2000 | Walker | .......................... | 180/219 |
| 6,189,957 | B1 | * | 2/2001 | Matsui et al. | ................. | 296/192 |
| 6,315,072 | B1 | * | 11/2001 | Brown et al. | .................. | 180/228 |
| 6,539,299 | B2 | * | 3/2003 | Chatfield et al. | ............... | 701/104 |
| 6,582,001 | B2 | * | 6/2003 | Yagisawa et al. | ............. | 296/37.1 |
| 6,846,018 | B2 | * | 1/2005 | Dennert et al. | ............... | 280/785 |
| 7,150,334 | B2 | * | 12/2006 | Kodan et al. | ................. | 180/68.4 |
| 7,201,246 | B2 | * | 4/2007 | Brendelson et al. | .......... | 180/228 |
| 7,234,558 | B2 | * | 6/2007 | Toftner | ......................... | 180/219 |
| 7,316,410 | B2 | * | 1/2008 | Ogura et al. | .................. | 280/279 |

(Continued)

FOREIGN PATENT DOCUMENTS

JP          11-129958         5/1999

*Primary Examiner* — Joanne Silbermann
*Assistant Examiner* — Maurice Williams
(74) *Attorney, Agent, or Firm* — Keating & Bennett, LLP

(57) ABSTRACT

A straddle-type vehicle (e.g., a motorcycle) includes an electrical component accommodating section to protect one or more electrical components from heat generated by an engine, even when the vehicle is stopped. The vehicle includes a head pipe, at least one tank rail extending rearward from the head pipe, and at least one down pipe extending downward from the head pipe. A first joint portion is defined between the head pipe and the tank rail, and a second joint portion is defined between the head pipe and the down pipe. An engine is disposed generally between the tank rail and the head pipe. The electrical component accommodating section houses at least one electrical component and is defined generally between the first and second joint portions. In a preferred mode, at least a portion of the electrical component accommodating section is made of heat insulating material to shield the electrical component from heat generated by the engine.

14 Claims, 8 Drawing Sheets

U.S. PATENT DOCUMENTS

| | | | |
|---|---|---|---|
| 2002/0043245 A1* | 4/2002 | Enoyoshi et al. | 123/406.24 |
| 2003/0079926 A1* | 5/2003 | Taniguchi et al. | 180/219 |
| 2003/0132837 A1* | 7/2003 | Hasegawa et al. | 340/440 |
| 2004/0206566 A1* | 10/2004 | Katsura | 180/219 |
| 2005/0061572 A1* | 3/2005 | Misaki et al. | 180/315 |
| 2005/0205073 A1* | 9/2005 | Fuller | 123/599 |
| 2006/0000652 A1* | 1/2006 | Yamaguchi et al. | 180/68.3 |
| 2006/0054375 A1* | 3/2006 | Kakinuma | 180/282 |

* cited by examiner

STRADDLE TYPE VEHICLE

CROSS-REFERENCE TO RELATED APPLICATIONS

The present application is based on and claims priority under 35 U.S.C. §119 to Japanese Patent Application No. 2005-139004, filed on May 11, 2005, the entire contents of which is hereby expressly incorporated by reference herein.

BACKGROUND OF THE INVENTION

1. Field of the Invention

The present invention relates to a straddle-type vehicle (e.g., a motorcycle) and, more particularly, to a straddle-type vehicle that includes an electrical component accommodating section to protect one or more electrical components from heat generated by an engine, even when the vehicle is stopped.

2. Description of the Related Art

Motorcycle designs have conventionally used a frame having a head pipe, a tank rail and a down tube. The head pipe usually supports handlebars in a rotatable manner with the tank rail extending rearward from the head pipe and the down tube extending downwardly from the head pipe. An engine is often disposed below the tank rail of the frame.

Prior motorcycles have also included an electrical component box for accommodating an electrical component such as ignition coil. The electrical component box has an air inlet and outlet to provide cooling air to pass through the box when the motorcycle is moving. See, for example, the electrical component box for a motorcycle disclosed in Japanese Patent Publication No. JP-B-3552498. In this manner, the electrical component is cooled to counteract the heat generated by the engine. Such cooling, however, occurs only when the motorcycle is moving.

SUMMARY OF THE INVENTION

An aspect of the present invention involves protecting one or more electrical components of the vehicle from heat generated by an engine, even when the vehicle is stopped. Another aspect of the present invention involves positioning such electrical component(s) to reduce cable lengths and simply wiring of the vehicle.

In accordance with at least one of these aspects of the present invention, there is provided a straddle-type vehicle that comprises a head pipe rotatably supporting a handlebar and at least one tank rail extending rearward from the head pipe. A first joint portion is defined between the head pipe and the tank rail. At least one down tube also extends from the head pipe. A second joint portion is defined between the head pipe and the down pipe, which extends downward from the head pipe. An engine is disposed generally between the tank rail and the down tube, and an electrical component accommodating section is defined generally between the first and second joint portions. The electrical component accommodating section houses at least one electrical component.

The electrical component accommodating section defined between the first and second joint portions generally insulates the electrical component from heat generated by the engine. Thus, the straddle-type vehicle shields the electrical component from such heat, even when the vehicle is stopped. Further, the space defined between the first and second joint portions is used as the electrical component accommodating section. Thus, the straddle-type vehicle saves space for the electrical component, as well as effectively locating it.

In a preferred embodiment, the vehicle includes a pair of left and right tank rails, and the electrical component accommodating section is defined between the pair of left and right tank rails. The vehicle can also include a pair of left and right down tubes with the electrical component accommodating section being defined between the pair of left and right down tubes.

In a preferred embodiment, at least a portion of the electrical component accommodating section is formed of a heat insulating material. The electrical component accommodating section can also include an opening (more preferably on its engine side) and a lid covering the opening. The electrical component is mounted on the face of the lid on the electrical component accommodating section side. At least the lid is formed of the heat insulating material.

The electrical component preferably is connected to the engine through a connecting wire, and the electrical component accommodating section is disposed adjacent to a top portion of the engine. The lid can include an opening through which the connecting wire can extend.

The present electrical component accommodating section can be used on a vehicle with a V-type engine having front and rear cylinder banks. The connecting wire preferably is connected to the front cylinder bank and to the electrical component (e.g., an ignition coil). In this manner, the connecting wire can service as a secondary wire connected to the front cylinder bank.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following eight figures.

As shown in FIG. 3, the electrical component is disposed within the electrical component accommodating section and is enclosed therein by a lid.

FIG. 6(a) is a right side plan view of a rear box cover, FIG. 6(b) is a right plan view of in inner side of an inner side box cover, and FIG. 6(c) is a right side plan view of a front box cover.

DETAILED DESCRIPTION OF THE PREFERRED EMBODIMENT

Figure 1:
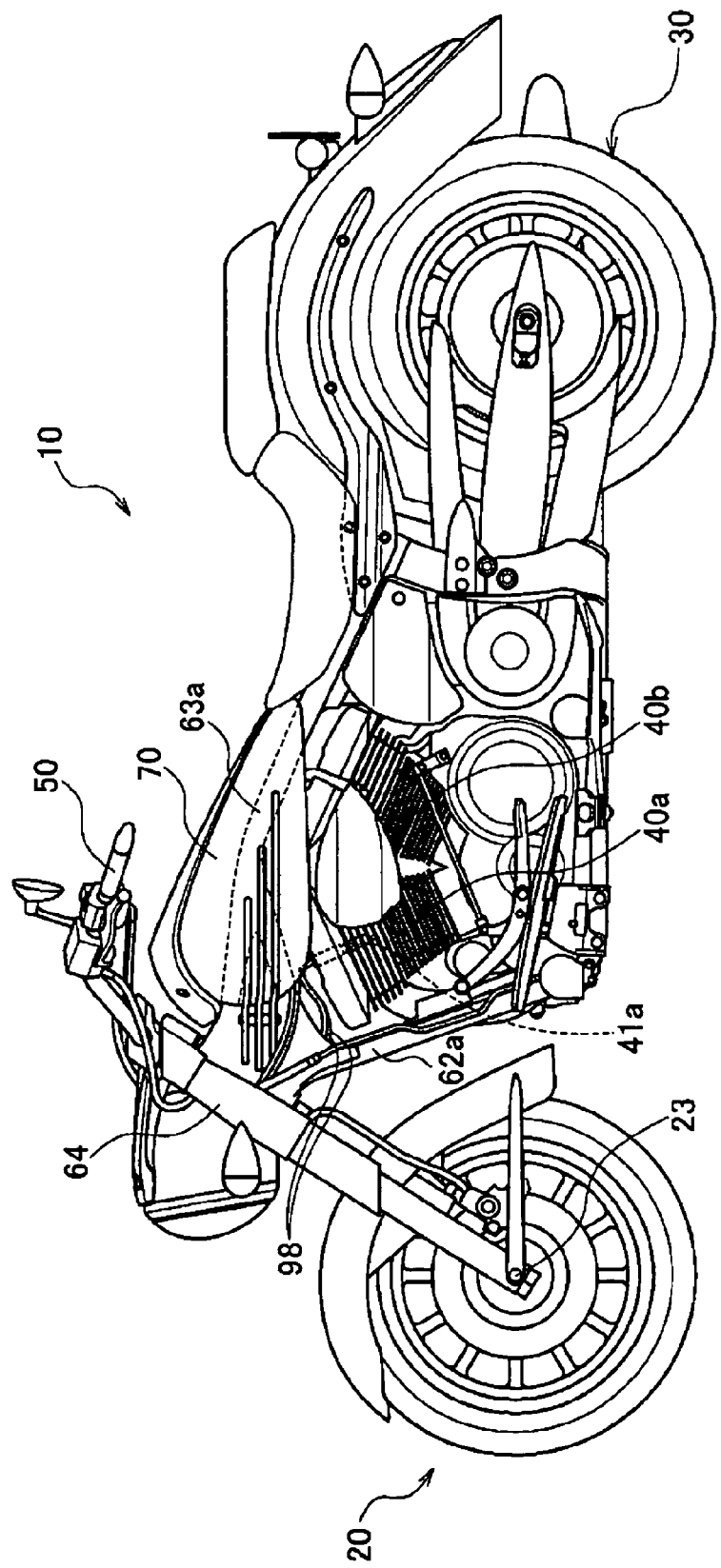
FIG. 1 is a left side view of a motorcycle configured in accordance with a preferred embodiment of the present invention.

A straddle-type vehicle configured in accordance with a preferred embodiment of the present invention will now be described with reference to the drawings. Corresponding or similar components are denoted in all the drawings by the same or similar reference numerals. It should be noted that the drawings are schematic and the proportions of the dimensions and so on can differ from those in reality. It should be also noted that a relationship or proportion of dimensions may be different between the drawings.

Various aspects and features of the present invention are particularly well suited for use on motorcycles and, as such, these aspects and features of the present invention will be described in this application; however, one or more of such aspects and features of the invention can be used with other types of straddle-type vehicles as well, such as, for example, motor scooters, motor-bikes, electric bicycles, ATVs and the like.

FIG. 1 is a left side view of a motorcycle 10 as a straddle-type vehicle in accordance with the present embodiment. As shown in FIG. 1, the motorcycle 10 has a front wheel 20 and a rear wheel 30. The rear wheel 30 is driven by a V-type engine 40 (a front bank 40a and a rear bank 40b of cylinders).

The engine 40 is located between a down tube 62 and a tank rail 63 and supported by the down tube 62 from below a vehicle body. The down tube 62 and the tank rail 63 define a portion of a vehicle body frame. In the illustrated embodiment, the vehicle body frame includes a pair of left and right down tubes 62a, 62b and a pair of left and right tank rails 63a, 63b.

In the illustrated embodiment, handlebars 50 are coupled to a front fork 64, which in turn is supported by a head pipe 61 (not shown in FIG. 1). In particular, the head pipe 61 rotatably supports a steering shaft of the front fork 64. A handlebar bracket is provided at the upper end of the steering shaft. The handlebars 50 are mounted to the handlebar bracket to couple the handlebar 50 to the steering shaft. The front fork 64 rotatably supports the front wheel 20, specifically an axle 23 of the front wheel 20. The head pipe 61 also defines a portion of the vehicle body frame and rotatably supports the handlebars 50.

As noted above, the down tubes 62 (the left down tube 62a is shown in FIG. 1. while the right down tube 62b is not) also defines a portion of the vehicle body frame and extends downwardly of the vehicle body from the head pipe 61. The tank rail 63 (the left tank rail 63a is shown in FIG. 1. while the right tank rail 63b is not) also defines a portion of the vehicle body frame and extends rearward of the vehicle body from the head pipe 61.

There is defined an electrical component accommodating section 65 between a joint portion of the down tube 62 to the head pipe 61 and a joint portion of the tank rail 63 to the head pipe 61, as described later (see FIG. 3). The electrical component accommodating section 65 accommodates one or more electrical component 95 (not shown in FIG. 1), such as ignition coil, which is connected to the front cylinder bank 40a. The electrical component 95 is connected to a spark plug 41a of the front bank 40a through secondary wires 98, through which power generated in the electrical component 95 (ignition coil) is fed.

As also seen in FIG. 1, the motorcycle 10 includes a fuel tank 70. The fuel tank 70 preferably has such a shape as to straddle the tank rail 63 (or rails 63a, 63b) laterally of the vehicle body and is supported with the tank rail 63 (or rails 63a, 63b).

Figure 2:
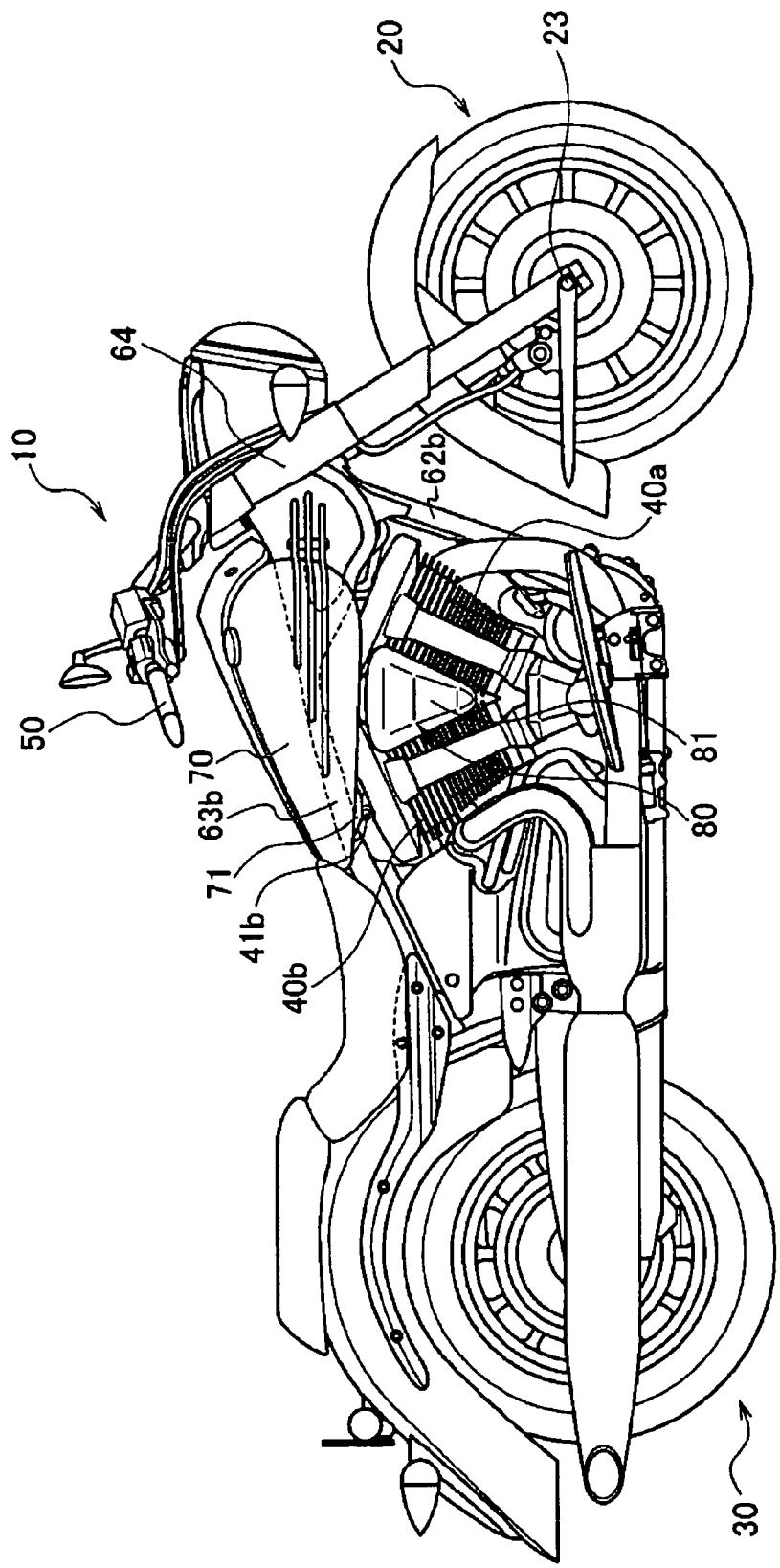
FIG. 2 is a right side view of the motorcycle of FIG. 1.

With reference now to FIG. 2, the right side of the motorcycle 10 can be seen. In the illustrated embodiment, the fuel tank 70 has a liquid spill prevention member 71 formed of an elastic material such as rubber. The liquid spill prevention member 71 is disposed outside the spark plug 41b in the lateral direction of the vehicle body. Consequently, fuel that spills and runs along the outer face of the fuel tank 70 does not drip onto the spark plug 41b.

Preferably, an accommodating box 80 accommodates an electrical component (not shown), such as an ignition coil, which is connected to the rear bank 40b, and is located between the front bank 40a and the rear bank 40b. An outside box cover 81 can be made of nylon or the like and can be attached to the outside face of the accommodating box 80 in the lateral direction of the vehicle body.

Figure 3:
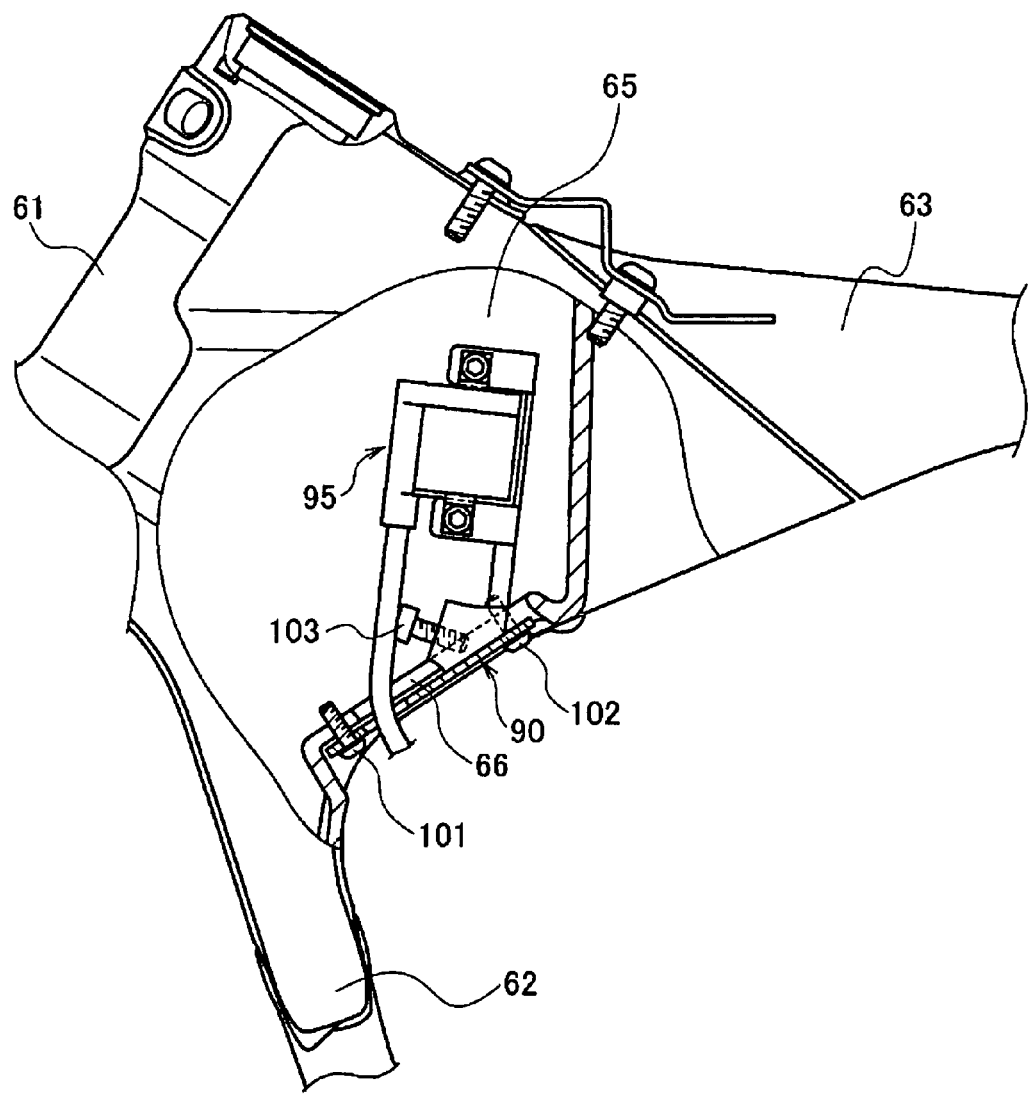
FIG. 3 is a left side view of a preferred embodiment of an electrical component accommodating section which is used on the motorcycle illustrated in FIG. 1.

FIG. 3 illustrates a left side of the electrical component accommodating section 65. In FIG. 3, a portion of the outside face of the electrical component accommodating section 65 is cut away to describe the inside thereof.

As shown in FIG. 3, the electrical component accommodating section 65 is defined between the joint portion(s) of the one or more down tubes 62 to the head pipe 61 and the joint portion(s) of the one or more tank rails 63 to the head pipe 61 and accommodates at least one electrical component 95. In the illustrated embodiment, the electrical component accommodating section 65 is formed by a plurality of fillet plates that extend generally between the left tank rail 63a and the left down pipe 62a, between the right tanks rail 63b and the left down pipe, between the pair of tank rails 63a, 63b, and between the pair of down pipes 62a, 62b. A bottom plate preferably closes the pocket formed by the down pipes 62, the tank rails 63, and the corresponding fillet plates.

The electrical component accommodating section 65 preferably has an opening 66 through which the electrical component 95 is inserted in the electrical component accommodating section 65. In the illustrated embodiment, the opening 66 is formed in the bottom plate on the engine 40 (front bank 40a) side of the electrical component accommodating section 65. A lid 90 covers the opening 66.

The electrical component 95 preferably is secured to the lid 90, with bolts 103, to close the opening 66 of the electrical component accommodating section 65. The lid 90 can be secured to the electrical component accommodating section 65 with fasteners, such as, for example with screws 101, 102.

Figure 4:
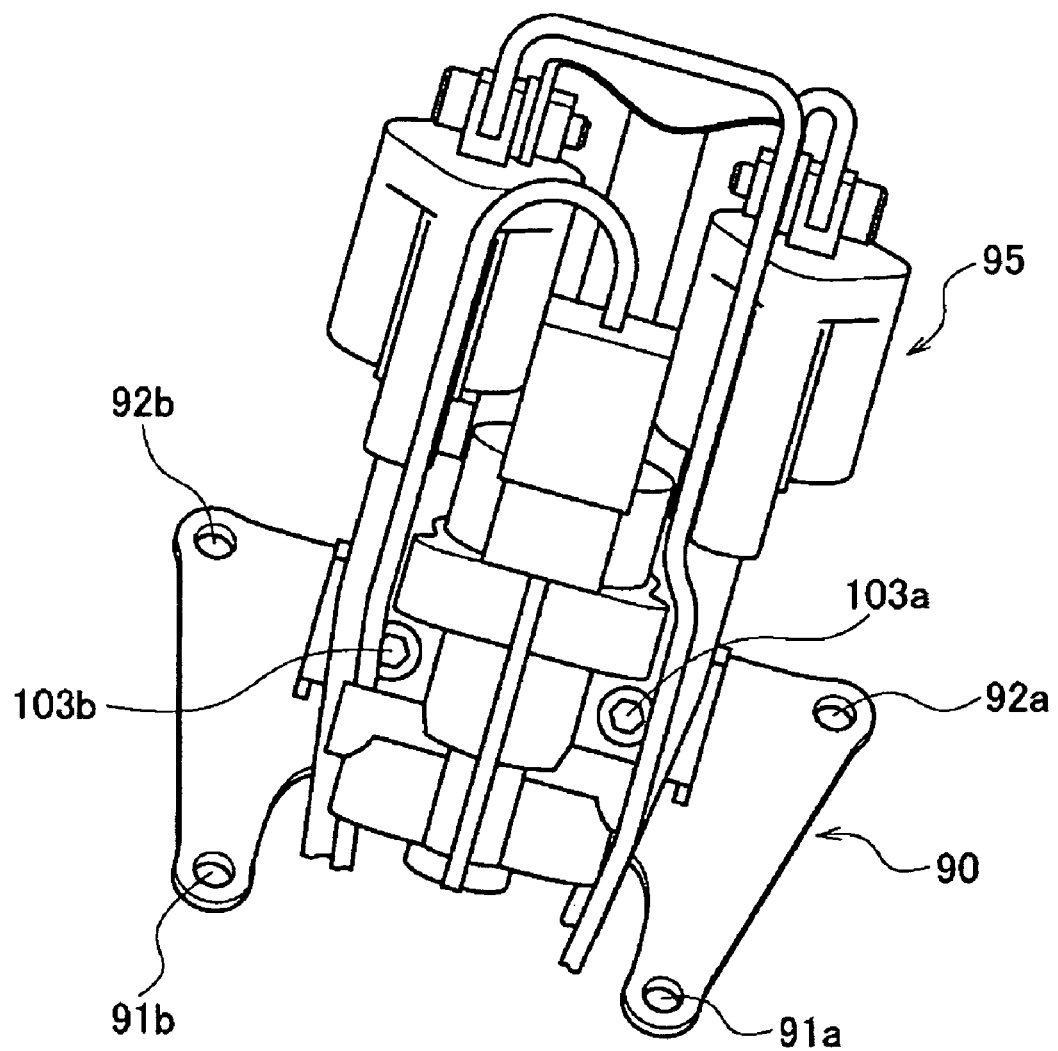
FIG. 4 is a perspective view showing the electrical component attached to the lid of FIG. 3, with the lid removed from electrical component accommodating.

The electrical component 95 preferably is inserted into the electrical component accommodating section 65, first being secured to the lid 90. FIG. 4 is a perspective view of the lid 90 showing the state of the electrical component 95 secured to the lid 90. As shown in FIG. 4, the electrical component 95 in the illustrated embodiment is secured to the lid 90 with the bolts 103 (specifically with bolts 103a, 103b).

The lid 90 has screw holes 91 (specifically screw holes 91a, 91b) in which the respective screws 101 described above are fitted, and screw holes 92 (specifically screw holes 92a, 92b) in which the respective screws 102 described above are fitted. As the lid 90 is secured to the electrical component accommodating section 65, a closed space is formed by the lid 90 and the electrical component accommodating section 65. The electrical component 95 is located in this closed space.

At least a portion of the electrical component accommodating section 65, which faces the engine 40, preferably is made of a heat insulating material (e.g., polypropylene). In the illustrated embodiment, the lid 90 is made of a heat insulating material for insulating the electrical component 95 from heat generated by the front cylinder bank 40a.

The lid 90, which closes the opening 66 of the electrical component accommodating section 65 on the front bank 40a side, thus protects the electrical component 95 from heat generated by the front bank 40a. The lid 90 also increases heat insulating properties of the electrical component accommodating section 65.

Additionally, the lid 90 provides for easy mounting of the electrical component 95 within the electrical component accommodating space. In particular, by mounting the electrical component 95 on the lid 90, the electrical component 95 is more easily inserted into the electrical component accommodating section 65.

Figure 5:
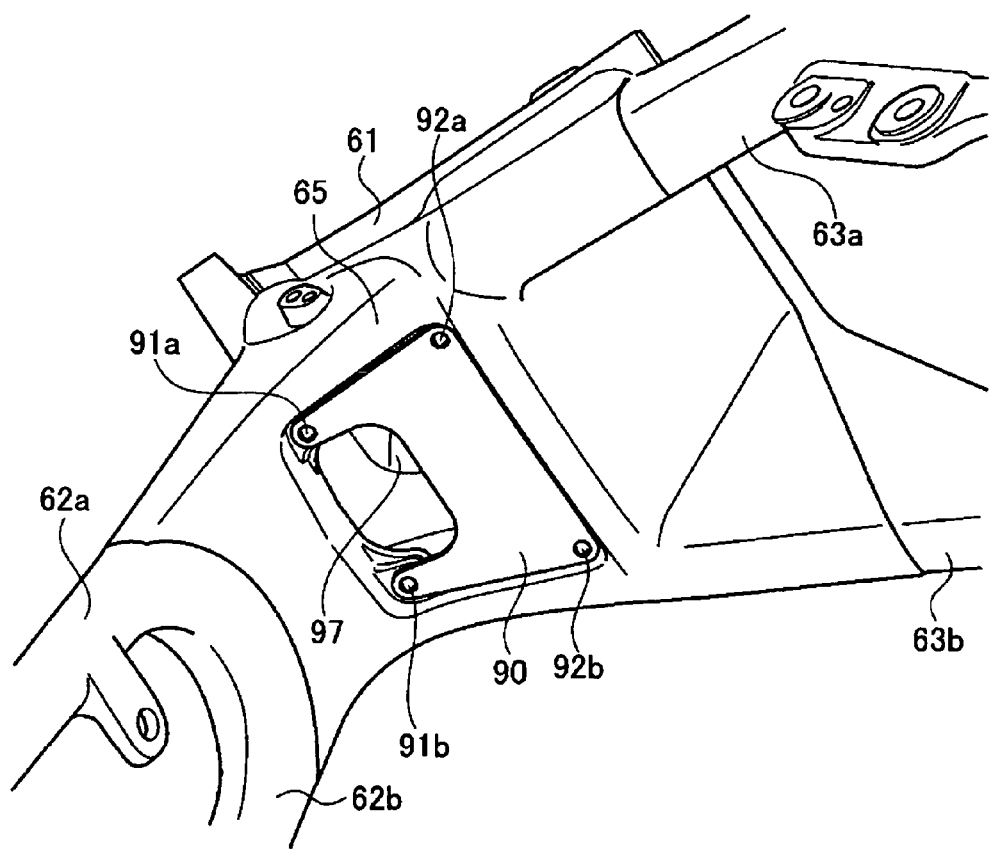
FIG. 5 is a bottom plan view of the electrical component accommodating section of FIG. 1.

FIG. 5 is a view of the electrical component accommodating section 65 as seen from below the vehicle body. As shown in FIG. 5, the electrical component accommodating section 65 is defined between the left down tube 62a and the right down tube 62b. The electrical component accommodating section 65 is also defined between the left tank rail 63a and the right tank rail 63b. The lid 90 has an opening 97 to allow insertion of the secondary wires 98.

FIG. 6(a) through FIG. 6(c) are developed views of the accommodating box 80 described above; FIG. 6(a) is a right side plan view of a rear box cover 84, FIG. 6(b) is a right plan view of in inner side of an inner side box cover 82, and FIG. 6(c) is a right side plan view of a front box cover 83. The outside box cover 81, which was described above, is not shown In FIG. 6(a) through FIG. 6(c).

Figure 6:
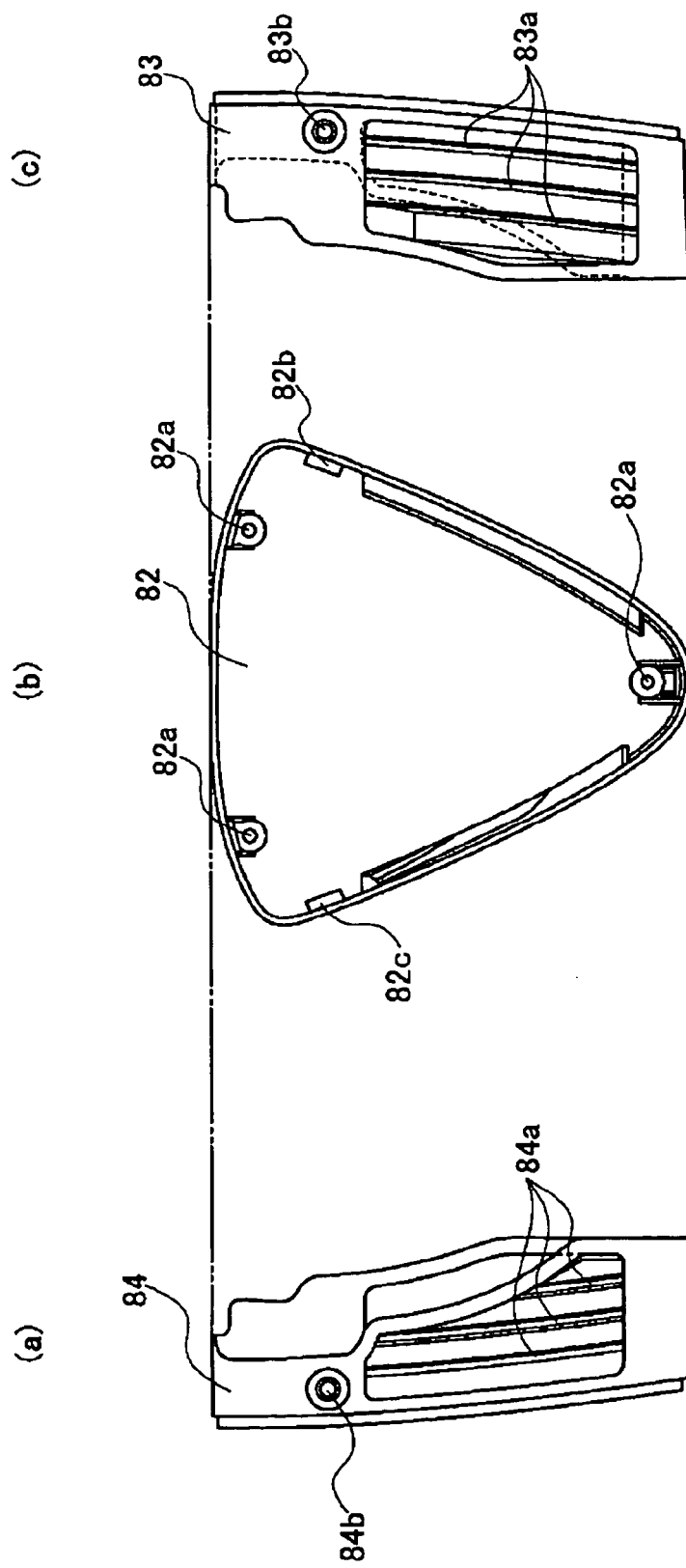
FIG. 6(a) through FIG. 6(c) are developed views of an electrical component accommodating box that is configured in accordance with a preferred embodiment.

As shown in FIG. 6(a) through FIG. 6(c), the accommodating box 80 is made up of the outside box cover 81 (not shown in FIG. 6), an inside box cover 82, a front box cover 83, and a rear box cover 84. The inside box cover 82 preferably is made of a heat insulating material (e.g., polypropylene) for insulating against heat generated by the front and rear cylinder banks 40a, 40b. The inside box cover 82 has plural screw holes 82a in which respective screws (not shown) for mounting the outside box cover 81 are fitted. The inside box cover 82 also has a screw hole 82b in which a screw (not shown) for mounting the front box cover 83 is fitted, and a screw hole 82c in which a screw (not shown) for mounting the rear box cover 84 is fitted.

The front box cover 83 has plural intake slits 83a for introducing a running wind (ram air), and a screw hole 83b in which a screw (not shown) for mounting the front box cover 83 to the inside box cover 82 is fitted. The intake slits 83a preferably extend vertically to easily introduce the running wind.

The rear box cover 84 has plural exhaust slits 84a for discharging the running wind (ram air), and a screw hole 84b in which a screw (not shown) for mounting the rear box cover 84 to the inside box cover 82 is fitted. The exhaust slits 84a preferably extend vertically to easily discharge the running wind.

Figure 7:
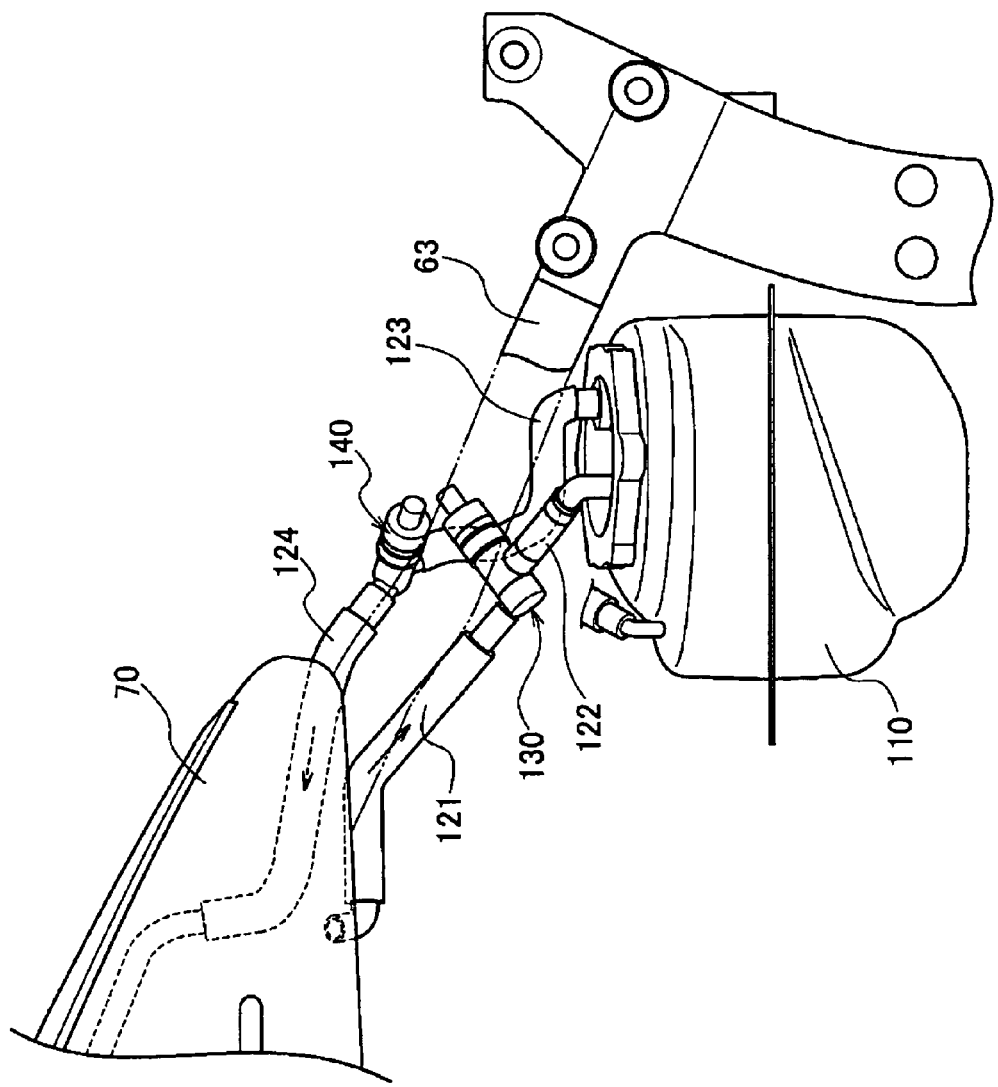
FIG. 7 is a left side view of a rear portion of a preferred embodiment of a fuel tank, which is used on the motorcycle shown in FIG. 1.

FIG. 7 is a left side view of a rear portion of the fuel tank 70 described above. In FIG. 7, part of the structure of the motorcycle 10 is not shown for simplicity of description.

As shown in FIG. 7, there is located a sub tank 110 on the rear side of the fuel tank 70. The fuel tank 70 and the sub tank 110 are connected to each other with a fuel pipe (a fuel pipe 121 and a fuel pipe 122). The sub tank 110 is connected to an air vent pipe (an air vent pipe 123 and an air vent pipe 124) for releasing air out of the sub tank 110 when fuel is delivered from the fuel tank 70 to the sub tank 110.

The fuel pipe 121 and the fuel pipe 122 are connected to each other through a valve 130, and the air vent pipe 123 and the air vent pipe 124 are connected to each other through a valve 140.

Figure 8:
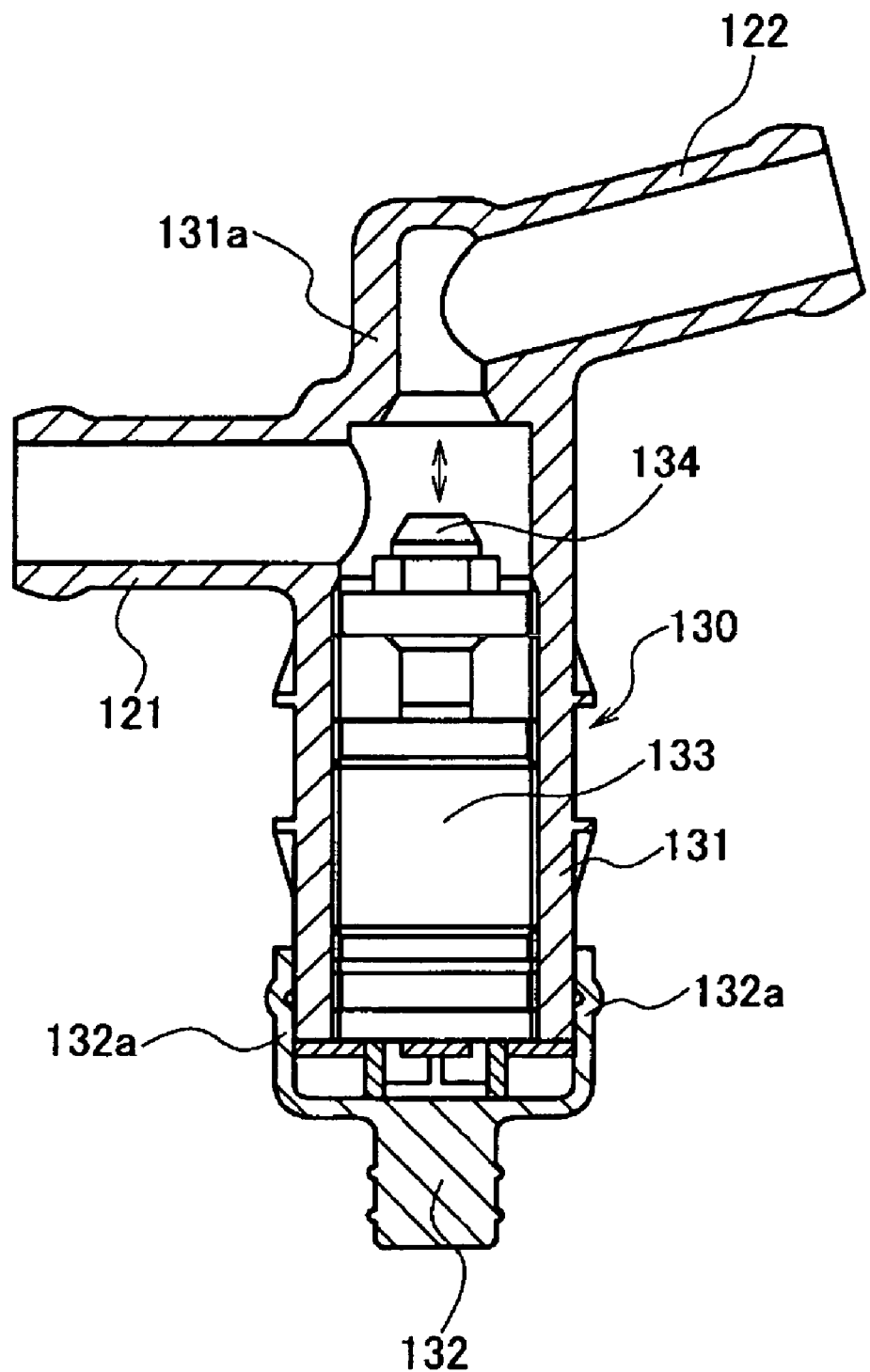
FIG. 8 is an enlarged sectional view of a preferred embodiment of a valve, which used on the motorcycle shown in FIG. 1.

FIG. 8 is an enlarged sectional view of the valve 130. Since the valve 140 has a similar structure to the valve 130, description is made taking the valve 130 as an example.

As shown in FIG. 8, the valve 130 is connected to the fuel pipe 121 and to the fuel pipe 122. The valve 130 includes a cylindrical portion 131, a cap 132, a body 133, and a leak prevention member 134.

The cylindrical portion 131 has a cylindrical shape and connects the fuel pipe 121 and the fuel pipe 122. The cap 132 is disposed at an end of the body 133 and has a cover portion 132a which covers an opening of the cylindrical portion 131 from outside the opening in a radial direction.

The body 133 of the valve 130 is turned together with the cap 132 at the end of the body 133 to be fitted in the cylindrical portion 131. The other end of the body 133 is provided with the leak prevention member 134 formed of an elastic material such as rubber.

The leak prevention member 134 has a diameter generally equal to the inside diameter of an end 131a of the cylindrical portion 131 which is connected to the fuel pipe 122. More specifically, the leak prevention member 134 has a shape to fill the inside of the end 131a of the cylindrical portion 131 when inserted in the cylindrical portion 131 together with the body 133.

In this manner just described, the fuel pipe (the fuel pipe 121 and the fuel pipe 122) connects the fuel tank 70 and the sub tank 110, and the fuel pipe 121 and the fuel pipe 122 are connected to each other through the valve 130. When the cap 132 of the valve 130 is turned, the leak prevention member 134 fills a connecting portion of the fuel pipe 121 and the fuel pipe 122. Thus, the motorcycle 10 is capable of easily preventing leaks of fuel from the fuel tank 70 or the sub tank 110 when the sub tank 110 is removed for maintenance or the like.

In the motorcycle 10 described above, the joint portions of the head pipe 61, down tube 62, and tank rail 63 define the electrical component accommodating section 65 for accommodating the electrical component 95 connected to the front bank 40a. More specifically, the electrical component accommodating section 65, which is disposed at the joint portion of the head pipe 61, down tube 62, and tank rail 63, insulates heat generated by the front cylinder bank 40a. Thus, the motorcycle 10 is capable of protecting the electrical component 95 from such heat, even when the motorcycle 10 is stopped. Further, the heat generated by the front cylinder bank 40a can be effectively transferred and released through the down tube 62 and the tank rail 63.

Further, the space defined between the joint portion of the down tube 62 to the head pipe 61 and the joint portion of the tank rail 63 to the head pipe 61 is used as the electrical component accommodating section 65. Thus, the layout of the motorcycle 10 saves space for the electrical component 95, as well as effectively locates it near the front cylinder bank 40a. In particular, the electrical component accommodating section 65 is disposed adjacent to a top portion of the front bank 40a. This allows shortening the length of the secondary wires 98 connecting the electrical component accommodating section 65 and the front bank 40a.

In the illustrated embodiment, the electrical component accommodating section 65 is defined between the left down tube 62a and the right down tube 62b. Thus, the left down tube 62a and the right down tube 62b are reinforced by the electrical component accommodating section 65, so that the strength of a joint portion of the left down tube 62a and the right down tube 62b increases. The electrical component accommodating section 65 is also defined between the left tank rail 63a and the right tank rail 63b. Thus, the left tank rail 63a and the right tank rail 63b are reinforced by the electrical component accommodating section 65, so that the strength of a joint portion of the left tank rail 63a and the right tank rail 63b increases. Further, the down tube 62 includes the left down tube 62a and the right down tube 62b, and the tank rail 63 includes the left tank rail 63a and the right tank rail 63b. This allows increasing the size of the electrical component accommodating section 65.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A straddle vehicle comprising:
   a head pipe rotatably supporting a steering shaft to which a handlebar of the vehicle is mounted,
   a pair of tank rails extending rearward from the head pipe,
   a fuel tank supported by the pair of tank rails,
   a first joint portion defined between the head pipe and the pair of tank rails,
   a pair of down tubes extending downwardly from the head pipe,
   a second joint portion defined between the head pipe and the pair of down tubes,
   an engine disposed between the pair of tank rails and the pair of down tubes, and
   an electrical component accommodating section housing at least one electrical component, wherein
   the electrical component accommodating section is located directly between the first and second joint portions, under the pair of tank rails, behind the pair of down tubes, and is at least partially defined by at least one fillet plate extending between the pair of tank rails or between the pair of down tubes,
   the electrical component accommodating section is enclosed by a plurality of walls, and
   the plurality of walls defining the electrical component accommodating section includes a lower wall, the lower wall including an opening, and a removable cover secured over the opening.

2. The straddle vehicle according to claim 1, wherein the electrical component accommodating section is located between the pair of tank rails.

3. The straddle vehicle according to claim 2, wherein the at least one fillet plate extends between the pair of down tubes, and the at least one fillet plate includes a second fillet plate extending between the pair of tank rails, wherein the electrical component accommodating section is further defined by the at least one fillet plate and the second fillet plate.

4. The straddle vehicle according to claim 1, wherein the electrical component accommodating section is defined between the pair of down tubes.

5. The straddle vehicle according to claim 4, wherein the at least one fillet plate extends between the pair of tank rails, and the at least one fillet plate includes a second fillet plate extending between the pair of down tubes, wherein the electrical component accommodating section is further defined by the at least one fillet plate and the second fillet plate.

6. The straddle vehicle according to claim 1, wherein the opening faces the engine.

7. The straddle vehicle according to claim 6, wherein the at least one electrical component is mounted on a face of the cover on the electrical component accommodating section side.

8. The straddle vehicle according to claim 6, wherein the cover is formed of a heat insulating material.

9. The straddle vehicle according to claim 6, wherein the at least one electrical component is connected to the engine through a connecting wire, and
   the electrical component accommodating section is disposed adjacent to a top portion of the engine.

10. The straddle vehicle according to claim 9, wherein the cover has an opening through which the connecting wire extends.

11. The straddle vehicle according to claim 9, wherein the engine is a V-type engine including a front cylinder bank and a rear cylinder bank disposed rearward of the front cylinder bank, and the connecting wire is connected to the front cylinder bank.

12. The straddle vehicle according to claim 11, wherein the at least one electrical component is an ignition coil, and the connecting wire is a secondary wire that is connected to the front cylinder bank.

13. The straddle vehicle according to claim 1, additionally comprising a second fillet plate extending between one of the pair of tank rails and one of the pair of down tubes, wherein the electrical component accommodating section is further defined by the at least one fillet plate and the second fillet plate.

14. A straddle vehicle comprising:
   a head pipe rotatably supporting a steering shaft to which a handlebar of the vehicle is mounted,
   a pair of tank rails extending rearward from the head pipe,
   a fuel tank straddling the pair of tank rails,
   a pair of down tubes extending downwardly from the head pipe,
   an engine disposed generally between the pair of tank rails and the pair of down tubes, and
   an enclosed electrical component accommodating section housing at least one electrical component, the enclosed electrical component accommodating section housing including a first connection between the head pipe and the pair of tank rails, a second connection between the head pipe and the pair of down tubes, wherein
   the electrical component accommodating section is located directly between the first and second connections, under the pair of tank rails, behind the pair of down tubes, and is at least partially defined by at least one fillet plate extending between the pair of tank rails or between the pair of down tubes,
   the electrical component accommodating section is enclosed by a plurality of walls and
   and the plurality of walls defining the electrical component accommodating section includes a lower wall, the lower wall including an opening, and a removable cover secured over the opening.

* * * * *